Oct. 5, 1943.  E. L. SITTER  2,331,144
MOTOR VEHICLE STEERING MECHANISM
Filed Dec. 16, 1940
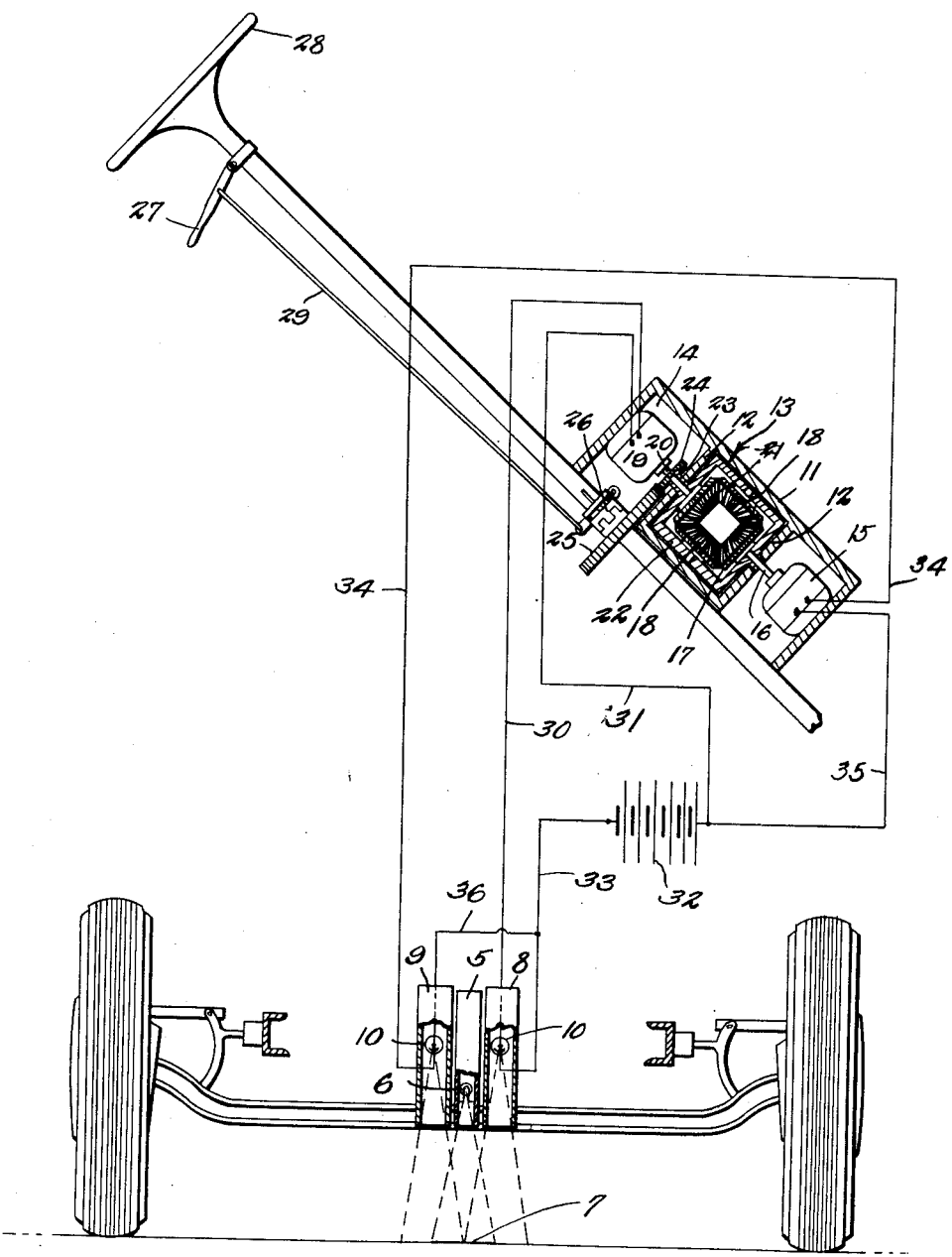
Evan L. Sitter
INVENTOR.
BY
ATTORNEYS.

Patented Oct. 5, 1943

2,331,144

UNITED STATES PATENT OFFICE 2,331,144

MOTOR VEHICLE STEERING MECHANISM

Evan L. Sitter, McLean, Tex.

Application December 16, 1940, Serial No. 370,423

1 Claim. (Cl. 180—79.1)

This invention relates to a steering device designed for use on motor vehicles, the primary object of the invention being to provide a steering device which will be automatic in its operation, to the end that a motor vehicle equipped with the device will be guided in a straight line along a highway against wind or other diverting forces, thereby relieving the operator of the responsibility of maintaining the vehicle in the center of the driving lane, over which the vehicle is moving.

An important object of the invention is to provide an automatic steering device including electric motors operable to move the steering gear in opposite directions to steer the vehicle, the electric current to the motors being controlled by the action of photoelectric cells mounted on the vehicle, and a light reflecting means arranged in the center of the traffic lane, whereby various degrees of light rays are directed to the photoelectric cell, which in turn controls the circuit to the motors, forming a part of the steering mechanism.

Another object of the invention is to provide means whereby the automatic steering mechanism may be thrown into and out of operation, at the will of the operator.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

The figure illustrates an elevational view partly in diagram, illustrating a steering device constructed in accordance with the invention.

Referring to the drawing in detail, the reference character 5 designates a light tube, in which the electric lamp 6 is mounted, the light tube 5 being mounted adjacent to the front of a motor vehicle, and in the exact center of the radiator grill, forming a part of the usual motor vehicle construction.

The lamp 6 is so arranged, that it will direct light rays onto a wide line 7, which is arranged centrally of the traffic lane, the line or stripe 7 being white to reflect the light rays from the lamp 6.

Arranged on opposite sides of the light tube 5, are tubes 8 and 9 in which the photoelectric cells 10 are mounted. The arrangement of the tubes 8 and 9, such that when the motor vehicle supplied with the device, is moving directly over the line 7 so that light rays from the lamp 6, are directed to the line 8 illuminating the entire width thereof, the light rays reflected by the line to said tubes 8 and 9 will take the form of circular areas at the line, the circular areas being tangent to each other at the exact center of the line.

Mounted on the steering post, is a gear housing indicated at 11 which is divided by the partitions 12, providing a central gear compartment 13, and end motor compartments 14. Mounted in one of the motor compartments, is a motor 15 which is provided with a shaft 16 on which the beveled gear 17 is mounted. Pinions 18 are also mounted within the gear compartment 13, and mesh with the gear 17. In the opposite motor compartment, is mounted a motor 19 which is provided with a shaft 20 on which the beveled gear 21 is mounted. The pinions 18 are mounted on shafts carried by the rectangular frame 22 which is formed with a hollow shaft 23 through which the shaft 20 of the motor 19 operates. A gear 24 is secured to the outer end of the hollow shaft 23, and meshes with the substantially large gear 25 that is loosely mounted on the steering post, and may be connected with the steering post to move therewith, by means of the clutch 26 which is operated by the lever 27 supported adjacent to the steering wheel 28 of the vehicle, the lever 27 being connected with the clutch 26 through the rod 29.

The photoelectric cell 10 mounted in the tube 8, is in circuit with the motor 19, through the wires 30 and 31, the wire 31 being connected with the battery 32. Wire 33 provides the secondary wire of the circuit.

The photoelectric cell mounted in tube 9, is in circuit with the motor 15, through the wire 34, the return or secondary circuit being through the wires 35, battery 32, wire 33 and wire 36.

From the foregoing it will be seen that due to the fact that each photoelectric cell "sees," or is exposed to a circular area in the pavement, and since these two areas are tangent to each other at the exact center of the vehicle, the point of tangency being in the exact center of the light reflecting line or stripe on the roadway, that as the vehicle swerves, the circular "seeing" or reflecting area of one photoelectric cell swings towards the reflecting stripe, there is an increasing response of one photoelectric cell as the stripe approaches the position where it becomes a diameter of the circular area. The result is that the action of the motor at one end of the gear box, is gradually increased as the car is swung by the driver, towards the guiding stripe from a position outside of the influence of the stripe.

For example, assuming that a motor vehicle equipped with the device is moving directly over the reflecting stripe in a road surface. It is obvious that the motors 15 and 19 will operate at the same speed, causing the gears to operate at the same speed, whereupon the gear 24 remains stationary. If the vehicle should swerve from a position centered over the stripe, an unequal amount of reflected light will be received by the photoelectric cells, which will result in decreasing the current supplied to one motor, and increasing the electric current supplied to the other, which will result in a turning or rotary movement of the gear 24 and substantially large gear 25, further resulting in movement of the steering post of the vehicle. Should the vehicle swerve in the opposite direction, the reverse of these actions take place to return the vehicle to a position directly over the center of the reflecting stripe of the road surface.

Should it be desired to steer or operate the vehicle without the influence of the automatic steering mechanism, the lever 27 is operated to move the clutch member 26, disengaging the substantially large gear 25 from the steering post, allowing the steering post to move freely and independently of the gear 25.

What is claimed is:

The combination with a reflecting stripe formed on a road surface, of an automatic steering device for motor vehicles, including a steering apparatus comprising a pair of electrical motors normally rotating at the same speed and operatively connected with the steering apparatus to operate the steering apparatus in opposite directions, electrical circuits including a source of electricity supply, connected with the motors, a photoelectric cell in each circuit, a light tube mounted at the front of the vehicle, a lamp in the light tube and adapted to direct light rays onto the reflecting stripe in an area of circular formation, tubes mounted on the opposite sides of said light tube and in which the photoelectric cells are mounted, each of said photoelectric cells being sensitive to the action of light rays from the light in the light tube directed onto the reflecting stripe, and reflected from the reflected stripe, and said photoelectric cells adapted to control the circuit to said motors, to regulate the relative speed of operation of said motors, according to the amount of light rays reflected, and gearing between the motors and steering device responsive only to the relative speed of said motors to transmit movement to the steering device, in a direction tending to equalize the amount of reflected light received by each photoelectric cell, to thereby guide the vehicle along said stripe.

EVAN L. SITTER.